Figure 1:
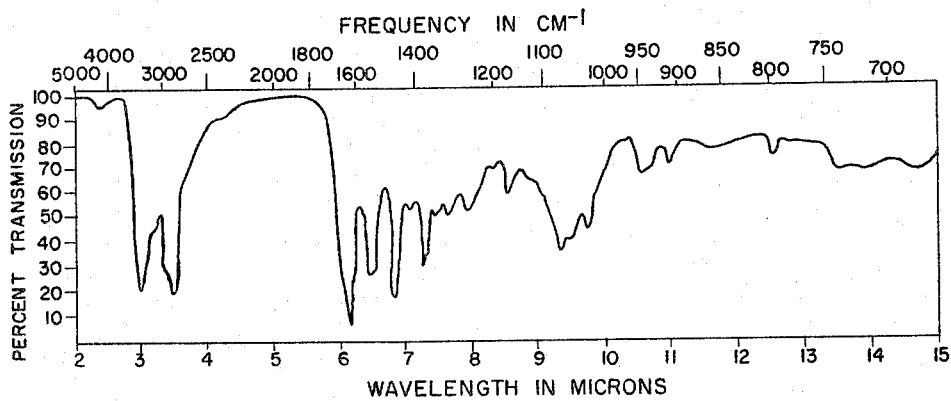

Aug. 2, 1966   J. D. DUTCHER ETAL   3,264,195
PROCESS FOR THE PREPARATION OF SEPTACIDIN AND DERIVATIVES
Original Filed July 24, 1963

INFRARED ABSORPTION SPECTRUM OF SEPTACIDIN

ULTRAVIOLET ABSORPTION SPECTRUM OF SEPTACIDIN

INVENTORS
JAMES D. DUTCHER
FELIX E. PANSY
MALCOLM H. VON SALTZA

BY Merle J. Smith

ATTORNEY 3,264,195
PROCESS FOR THE PREPARATION OF SEPTA-
CIDIN AND DERIVATIVES
James D. Dutcher, New Brunswick, Felix E. Pansy,
Jamesburg, and Malcolm H. von Saltza, Millstone, N.J.,
assignors, by mesne assignments, to E. R. Squibb &
Sons, Inc., New York, N.Y., a corporation of Delaware
Original application July 24, 1963, Ser. No. 297,446, now
Patent No. 3,155,647, dated Nov. 3, 1965. Divided and
this application Mar. 16, 1964, Ser. No. 356,686
3 Claims. (Cl. 195—80)

This application is a division of application, Serial No. 297,446, filed July 24, 1963, having U.S. Patent No. 3,155,647, issued November 3, 1965.

This invention relates to new compounds, their salts and to the production thereof. More particularly, this invention relates to new physiologically active compounds, methods of their production and new intermediates useful therein.

The compounds of this invention may be represented by the formula

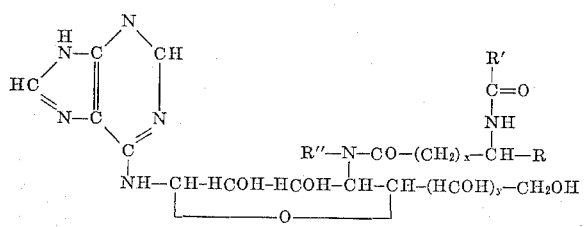

wherein R is selected from the group consisting of hydrogen, lower alkyl (e.g. methyl, ethyl, propyl, butyl, etc.), hydroxy lower alkyl (e.g. hydroxy methyl, hydroxy ethyl), lower alkyl-cycloalkyl (such as methyl-cyclohexyl), lower alkylphenyl (e.g. methyl-phenyl), lower alkyl-hydroxy phenyl (e.g. methyl-hydroxy phenyl) and lower alkyl-dihydroxyphenyl (e.g. methyl-dihydroxyphenyl); R'' is selected from the group consisting of hydrogen and lower alkyl (e.g. methyl); $x$ is selected from the group consisting of 0 and 1; $y$ is selected from the group consisting of 0, 1 and 2; and R' is selected from the group consisting of alkyl, straight or branched chain of from 3 to 20 carbon atoms, alkenyl, and alkadienyl. Preferably the alkyl, alkenyl or alkadienyl group is of from 10 to 18 carbon atoms inclusive.

The compounds of this invention are physiologically active and are useful as fungicides against such fungi as dermatophytes, for example, Trichophyton mentagrophytes, Microsporon gypseum, Microsporon canis and other like microorganisms. For these purposes, the compounds of this invention may be administered topically in the form of a powder or a cream, the dosage and frequency of the treatment dependent on the relative potency of the compound employed.

The compounds of this invention are prepared by first culturing under controlled conditions of hitherto undescribed strain of Streptomyces fimbriatus, isolated from a soil sample obtained in Nevada, United States of America, a culture of which organism has been deposited with and made part of the American Type Culture Collection, Washington, D.C., where it has been assigned the number ATCC 15051. [It is to be specifically understood that this invention is not limited to the use of this strain, or to microorganisms fully answering the description thereof, for the preparation of the compounds of this invention. Thus, the invention includes use of mutants produced from the described microorganism by mutating agents, such as X-rays, ultraviolet radiation, nitrogen mustards, etc.]

The compounds of this invention are prepared by first culturing of a strain of the microorganism Streptomyces fimbriatus ATCC 15051, in a fermentation medium under aerobic conditions. The fermentation medium contains the usual nutrients and mineral sources supplying carbon, nitrogen and energy to the developing culture. Suitable nutrients include, for example, carbohydrates, such as starch, mannitol, xylose, inositol, arabinose, rhamnose, frutose and sucrose; nitrogen sources, such as L-asparagine and L-tyrosine; inorganic salts such as ammonium sulfate, sodium nitrite, sodium nitrate as well as trace elements and other conventional substances. The conditions of fermentation are generally the same as the conventional methods of producing tetracyclines by fermentation.

The medium (A) employed for inoculum slants has the following composition:

| | Gm. |
|---|---|
| Rolled oats | 65.0 |
| Agar | 20.0 |
| Distilled water to one liter. | |

The rolled oats are cooked to a thin gruel, filtered, restored to volume the 20 grams of arag are added. The mixture is then sterilized for 30 minutes at 131° C. and then allowed to cool in a slanted position at 25° C. The slants are inoculated with a culture of S. fimbriatus ATCC 15051 and incubated at 25° C. for 14 days.

The inoculum for flask or bottle fermentations is prepared by suspending some of the growth from an inoculum slant in water. This water suspension is then added to a sterile medium of the following composition (B) in flasks or bottles:

| | |
|---|---|
| Soybean meal | 15 gm. |
| Dehydrated mashed potato | 15 gm. |
| Glucose | 50 gm. |
| $CoCl_2 2H_2O$ | 10 ml. of a 0.05% solution. |
| $CaCO_3$ | 10 gm. |
| Distilled water | 10 gm. |

Growth of the inoculum in 125 ml. of medium B in a 500 ml. flask is carried out at about 25° C. on a rotary shaker (280 r.p.m.; 2″ throw), for about seven days.

Alternatively, when stirred jar fermenters are employed in the practice of this invention, the following sterile fermentation medium (C) may be used in place of medium B:

| | G. |
|---|---|
| Soybean meal (extracted) | 30 |
| Glucose | 50 |
| $CaCO_3$ | 7 |
| Corn steep liquor | 2.5 |
| Distilled water to make 1 liter. | |

The fermentation of the inoculum in 4.5 l. of medium C in a stirred jar fermenter is carried out at about 25° C. for about 96 hours with good yield.

The desired product of the fermentation may then be obtained either by extraction of the total broth with a suitable solvent such as n-propanol, or iso-propanol; or by suitable solvent extraction, such as with n-propanol, n-butanol, pentanol, hexanol and the like, of only the mycelial cake. In either case, subsequent removal of the organic solvent by evaporation in vacuum leads to an aqueous suspension of the product. After washing of the solids with ether or hexane to remove impurities, the solid may be filtered or centrifuged off and dried in vacuum. The product may be further purified by recrystallization from dimethylformamide, dimethylsulfoxide, pyridine or glacial acetic acid by the addition of methanol, propanol or water.

Figure 2:
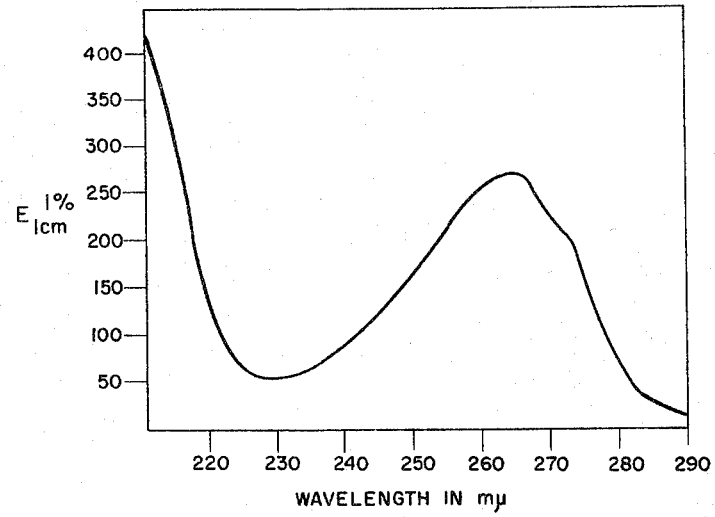

This fermentation product, although it is an intermediate for the final products of this invention, also possesses certain physiological and antibiotic activity, and is useful as an antifungal agent and is effective for such purposes against such microorganisms as *Trichophyton mentagrophytes* and *Microsporon gypseum*. This fermentation product has the following properties: M.P. 215–220° C., with decomposition (darkening at 188° C.); specific rotation, $[\alpha]_D+6.6°$ (c., 1.0 in dimethylformamide). It is soluble in glacial acetic acid, pyridine and dimethylformamide, while it is substantially insoluble in water, ethanol, methanol, propanol, butanol, ethyl acetate, ether, benzene, chloroform and hexane. The fermentation product may be titrated with perchloric acid in a glacial acetic acid solution, and in dimethylformamide solution, with potassium methylate in methanol. The neutralization equivalents so determined are 620 and 622 respectively, in agreement with the empirical formula $C_{30}H_{51}N_7O_7$ (molecular weight=621.8). The approximate analysis of this product ($C_{20}H_{51}N_7O_7$) is: Carbon, 58.00%; hydrogen, 8.25%; nitrogen, 15.75%; oxygen, 18.00%. Ninhydrin, Fehlings' and Tollens' tests are negative, while the biuret test is weakly positive. The infrared and ultraviolet absorption spectra of this product are shown in the attached drawings of FIGURE 1 and FIGURE 2. This new antibiotic product has been designated as "Septacidin" and will hereinafter be referred to thereby.

Degradative and analytical studies have been that septacidin possesses the structure shown in the formula set forth above wherein $x=0$, $y=1$, R and $R''=H$, and $R'$ equals a mixture of straight and branched alkyl groups of 11 to 17 carbon atoms in length.

The final products of this invention are then prepared by a number of chemical steps which entail employing septacidin as the starting material. This may be accomplished by first treating the septacidin with a hydrolyzing agent, such as an alcoholic mineral acid, for example, methanolic hydrochloric acid, to cleave the N-acyl glycine portion from the balance of the molecule.

The remaining unique 6-septosaminyl-amino)-purine may then be reacted with a chosen acylating agent, for example, an N-acyl amino acid p-nitrophenyl ester, for example, N-acyl glycine p-nitrophenyl ester, N-acyl alanine p-nitrophenyl ester, N-acyl-sarcosine p-nitrophenyl ester, N-acyl valine p-nitrophenyl ester, N-acyl serine p-nitrophenyl ester, N-acyl theronine p-nitrophenyl ester, N-acyl leucine p-nitrophenyl ester, N-acyl-isoleucine - p - nitrophenyl ester; N - acyl norleucine-6-nitrophenyl ester, N-acyl - phenylalanine p - nitrophenyl ester, N-acyl tyrosine p-nitrophenyl ester, N-acyl dihydroxyphenyl-alanine p-nitrophenyl ester, and other like compounds (the "acyl" radical of this acylating agent is one of a hydrocarbon carboxylic acid of from 4 to 20 carbon atoms and includes such acids as butyric acid, iso-butyric acid, valeric acid, caproic acid, caprylic acid, pelargonic acid, capric acid, undecanoic acid, lauric acid, tridecanoic acid, myristic acid, pentadecanoic acid, palmitic acid, margaric acid, stearic acid, oleic acid, linoleic acid, iso-palmitic acid, nonadecanoic acid, and other like acids), to yield the new final products of this invention.

Additionally, it has been found that other new final products of this invention, i.e., wherein $y$ is 0 or 2, may be obtained employing septacidin as starting material. In order to obtain hexosamine analogs of septacidin (i.e., wherein $y$ is 0), septacidin is treated with sodium metaperiodate to yield an aldehyde intermediate product which is then reduced as by treatment with sodium borohydride to yield the hexosamino analog of septacidin (i.e., wherein $y$ is 0). This intermediate aldehyde product may also be employed to obtain the octosamino analogs of septacidin (i.e., wherein $y$ equals 2). This aldehyde product resulting from the periodate oxidation of septacidin is first condensed in an aqueous or methanolic solution with 2-nitro-ethanol using sodium hydroxide or sodium methoxide as a catalyst. The resulting C-nitro product is then hydrolyzed with dilute acid and then reduced with sodium borohydride to yield the octosamino analog of septacidin (i.e., wherein $y$ equals 2). Either of these analogs (i.e., the hexosamine or octosamine, wherein $y$ is 0 or 2) may then be employed in the same manner as set forth hereinbefore for septacidin to produce the respective (hexosaminyl - amino)purine, or (octosaminyl - amino)purine analogs.

The resultant products may then be treated with an acylating agent, such as one of those set forth hereinabove, to yield the additional new final products of this invention.

The following examples are illustrative of the invention.

EXAMPLE 1

(A) *Preparation of inoculum and fermentation*

A culture of *Streptomyces fimbriatus* ATCC 15051, maintained on agar slants (rolled oats-agar per medium A) is used. A transfer is made from a slant to a 500 ml. Erlenmeyer flask containing 125 ml. of medium B and 0.25% of agar. The flask is incubated at 25° C. on a reciprocating shaker (2 inch throw, 280 r.p.m.) for 96 hours. A 10% transfer is made into three 500 ml. Erlenmeyer flasks containing 125 ml. of medium B and the flasks are incubated at 25° C. on a reciprocating shaker (2 inch throw, 280 r.p.m.) for 168 hours. The contents of the flasks are pooled and used in the isolation of the compounds of this invention as described hereinafter.

(B) *Isolation of the compounds*

(1) *Isolation from mycelial cake.*—The pooled fermentation cultures of part A, Example 1, may first be separated into the mycelium and culture liquid components by use of a filter aid. The culture liquid may be discarded. The moist mycelial cake is then suspended with one-half volume of moist n-butanol and agitated vigorously for one hour. The pH of the extract is adjusted to between pH 6.0 and 8.0. The solids are then filtered off and the filtrate reserved. The solids are then resuspended in an additional one-half volume of moist n-butanol and the extraction repeated. The n-butanol extracts are then combined and evaporated in vacuum at a temperature not above 35° to remove the n-butanol. When all the n-butanol is removed, an aqueous phase remains, which contains the septacidin as a solid in suspension. This solid in suspension is washed several times with ether. This ether extraction removes a considerable amount of lipid-like material which is discarded. After washing, the solids are filtered from the aqueous phase, washed with portions of water, then methanol and allowed to dry in vacuum, yielding crude septacidin.

(2) *Isolation from the fermentation broth.*—Alternatively, after the fermentation is completed as described above in part A of Example 1, the pooled mixture may be treated with two volumes of n-propanol, agitated and allowed to stand at 25° for about 18 hours with occasional shaking. The coagulated mycelium and solids are then filtered off and the filtrate concentrated in vacuum at reduced temperature, not over 35°, until the n-propanol is removed and the volume remaining is one-half or less of the original culture volume. This aqueous concentrate is then repeatedly extracted with a water immiscible solvent such as n-butanol and the combined solvent extracts treated further according to the procedures set forth hereinabove for the isolation of the product from the mycelial cake, in part B(1) of Example 1, thus yielding the fermentation product, septacidin.

(C) *Purification of septacidin*

The crude septacidin obtained in part B is a pale colored, amorphous or semi-crystalline powder. This crude powder is suspended in three volumes of dimethylformamide and agitated in a water bath at 75° to 80° for about 15 minutes. The resultant suspension is then centrifuged and the resultant sediment retreated with dimethylformamide. The resultant suspension is again centrifuged and the supernatants combined and treated with an equal volume of methanol which causes a precipitation to form after a short time. The solution is then left to stand approximately eight hours to permit complete precipitation. The first crop is separated by filtration and washed with several small portions of methanol which are then added to the filtrate. Additional methanol to make another volume is then added to the filtrate to produce a second crop of sepacidin. An additional recrystallization of the combined first and second crops by the same procedure gives septacidin having the following properties: M.P. 215–220° with decomposition (darkening at 188°); specific rotation, $[\alpha]_D +6.6°$ (c., 1.0 in dimethylformamide); Infrared absorption spectrum: shown in FIGURE 1 of the appended drawings. [Spectrum taken in hydrocarbon mull (Nujol).]

Ultraviolet absorption spectrum (neutral solvent shown in FIGURE 2):

$\epsilon = 17{,}000$, $\lambda$ max. 264 m$\mu$, $E^{1\%}_{1\,cm.}$ 275 m$\mu$; $\lambda$ shoulder 271 m$\mu$, $E^{1\%}_{1\,cm.}$ 220, in neutral solvent; $\lambda$ max. 273 m$\mu$, $E^{1\%}_{1\,cm.}$ 229, in HCl solvent system; $\lambda$ max. 272 m$\mu$, $E^{1\%}_{1\,cm.}$ 295, in NaOH solvent system. Empirical molecular formula: $C_{30}H_{51}N_7O_7$.

EXAMPLE 2

*6-(septosaminyl-amino)purine, dihydrochloride*

1.22 g. of septacidin are suspended in 50 ml. of absolute methanol and treated with 50 ml. of 0.72 N methanolic hydrogen chloride (final concentration of hydrochloric acid thus 0.36 N). The mixture is gently stirred at room temperature (20° to 25°) and the septacidin gradually dissolves. After 12 hours stirring the solution is allowed to stand for another 12 to 24 hours and then poured with stirring into 300 ml. of dry ether. The flocculent white precipitate which forms is centrifuged down or filtered off, washed with two small portions of ether and dried in vacuum, yielding 750 mg. of 6-septosaminyl-amino)purine, dihydrochloride. The ether-methanol supernatant solution on evaporation yields the mixed methyl esters of the N-acylated glycine portion of the septacidin molecule. The 6-(septosaminyl-amino) purine, dihydrochloride may be crystallized by dissolving in a small volume of water (0.5 ml.) and then adding several volumes of ethanol or n-propanol with scratching and stirring and chilling. Colorless needles in clusters are obtained which may be filtered off, washed and dried in vacuum to yield 6-(septosaminyl-amino)purine dihydrochloride, having a melting point of about 205–206° with decomposition after darkening and shrinking at 180 to 190°.

*Analysis.*—Calcd. for $C_{12}H_{18}N_6O_5 \cdot 2HCl$: C, 36.10; H, 5.05; N, 21.05; Cl, 17.76. Found: C, 35.93; H, 5.12; N, 20.96; Cl, 17.58.

Similarly, following the procedure set forth in Example 2 but substituting an equivalent amount of methanolic sulfuric acid for the methanolic hydrochloric acid, yields the sulfate salt of 6-(septosaminyl-amino)purine.

EXAMPLE 3

*N-stearoyl glycine-p-nitrophenyl ester*

N-Stearoyl glycine may be prepared by the mixed anhydride method of Fieser [Fieser, M., Fieser, L. F., Toromanoff, E., Hirata, Y., Heymann, H., Tefft, M. and Bhattacharya, S., J. Am. Chem. Soc., 78, 2825 (1956)] employing stearic acid, ethylchloroformate, and glycine. The N-stearoyl glycine is then treated according to the general procedure of Bodanszky and Du Vigneaud for the preparation of its p-nitrophenyl ester (Bodanszky, M. and Du Vigneaud, V., Biochemical Preparations, 9, 110 [1962], John Wiley & Sons, N. Y.).

0.72 g. (3 mmoles) is dissolved in 15 ml. of dimethylformamide together with 0.46 g. (ca. 15 percent excess) of p-nitrophenol. To this solution, which is stirred in an ice-water bath, is added 0.68 g. of dicyclohexylcarbodiimide (ca. 10 percent excess). This reagent quickly dissolves with the stirring and shortly N,N'-dicyclohexylurea begins to precipitate out. After 1 hour stirring in the cold, the solution is allowed to slowly warm to room temperature as the stirring is continued for another four hours. At the end of this time the precipitate is filtered or centrifuged off and the filtrate poured into 100 ml. of ice-water. The N-stearolyglycine-p-nitrophenylester which precipitates is filtered off and recrystallized from 95 percent ethanol containing a trace of acetic acid. Nearly colorless needles, M.P. 130–135° softening at 100–115° in 80% yield are obtained.

Similarly, following the procedure set forth in Example 3, but substituting equivalent amounts of butyric acid, valeric acid, caproic acid, caprylic acid, pelargonic acid, capric acid, undecanoic acid, lauric acid, tridecanoic acid, myristic acid, pentadecanoic acid, palmitic acid, margaric acid, oleic acid, linoleic acid, isopalmitic acid and nonadecanoic acid for stearic acid, there is obtained the corresponding N-acyl-glycine p-nitrophenyl ester.

Similarly, following the procedure set forth in Example 3, but substituting equivalent amount of L-alanine, D-alanine, β-alanine, sarcosine, L-valine, D-valine, L-serine, D-serine, L-threonine, D-threonine, L-leucine, D-leucine, L-isoleucine, D-isoleucine, L-phenylalanine, D-phenylalanine, norleucine, tyrosine, dihydroxyphenylalanine, and norvaline, for glycine, there is obtained the corresponding N-stearoyl (amino acid) p-nitrophenyl ester.

(It is to be understood that the substitutions of the hydrocarbon carboxylic acids and the amino acids can be freely made so that any combination of the two is possible. In other words any of the above listed hydrocarbon carboxylic acids may be substituted for stearic acid at the same time that any of the above listed amino acids is substituted for glycine, to yield the desired N-acyl amino-acid p-nitrophenyl ester.)

EXAMPLE 4

*Hexosamine analog of septacidin*

1.0 g. of finely powdered septacidin (1.6 mmoles) is suspended in 50 ml. of carbon dioxide free water and 32 ml. of 0.1 N aqueous sodium metaperiodate solution is added (3.2 mmoles). The suspension is shaken in the dark at room temperature. At hourly intervals a small aliquot is removed to determine the amount of periodate consumed. After three hours approximately one equivalent has been consumed. The solution is shaken for 12 more hours but little further oxidation occurs. The reaction mixture is then centrifuged and the precipitate washed twice with small portions of water. The solid may be washed with a little methanol and dried in vacuum at this point or dissolved in 0.1 N aqueous sodium hydoxide solution for reduction with sodium borohydride. After dissolving in 50 ml. of this solvent it is chilled to 5° C. and treated with portions of a solution of sodium borohydride in 0.1 N aqueous sodium hydroxide, with continuous stirring. About a 3 mole excess of sodium borohydride is added and the solution stirred for 3 hours, allowing the temperature to slowly rise to 24°. The excess of sodium borohydride is then decomposed with an aqueous 10% acetic acid solution and the precipitate centrifuged down, washed with water and dried. yielding the hexosamine analog of septacidin.

EXAMPLE 5

*6-(octosaminyl-amino)purine*

0.635 g. (1 mmole) of septacidin periodate oxidation product obtained in Example 4 is suspended with stirring in 25 ml. of methanol and to this is added a solution in 25 ml. of methanol of 5 equivalents (0.565 g.) of sodium aci-nitroethanol, prepared according to the procedure of Noland and Hartman (J. Am. Chem. Soc., 76, 3227 [1954]). An additional equivalent (54 mg.) of sodium methoxide in 5 ml. of methanol is added and the solution allowed to stand 48 hours at 24°. The sodium salts of the condensation products are converted to the nitro compounds by the slow addition of glacial acetic acid and then, without isolation, hydrolyzed by stirring in 1.5 ml. of concentrated sulfuric acid that has been diluted with 1.6 ml. of water. After several minutes stirring at room temperature, 50 ml. of water is added and the precipitate which forms is filtered off, washed with water and dried in vacuum. The product may then be dissolved in 0.1 N sodium hydroxide and treated with sodium borohydride, as in Example 4, to yield the octosamine analog of septacidin.

Both the hexosamine analog (Example 5) and octosamine analog (Example 6) of septacidin may be hydrolyzed with 0.37 N methanolic hydrogen chloride as in Example 2 for septacidin, to yield the dihydrochlorides of 6-(hexosaminyl-amino)purine and 6-(octosaminyl-amino)purine respectively.

EXAMPLE 7

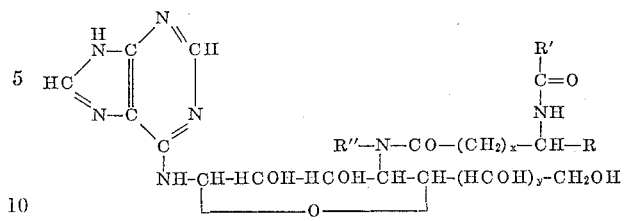

(A) Employing as a starting material the 6-(septosaminyl-amino)purine of Example 2, and the p-nitrophenyl ester acylating agents set forth below, and following the procedures set forth in Example 6, the nature of the substituents of the above formula are reported in Table I below:

TABLE I

| Acylating Agent (p-nitrophenyl ester) | R | R' | R'' | x | y* |
|---|---|---|---|---|---|
| N-myristyl-alanine | $-CH_3$ | $C_{13}H_{27}$ | H | 0 | 1 |
| N-oleoyl-glycine | $-H$ | $C_{17}H_{33}$ | H | 0 | 1 |
| N-palmitoyl-valine | $-CH(CH_3)_2$ | $C_{15}H_{31}$ | H | 0 | 1 |
| N-stearoyl-alanine | $-CH_3$ | $C_{17}H_{35}$ | H | 1 | 1 |
| N-caproyl-serine | $-CH_2OH$ | $C_5H_{11}$ | H | 0 | 1 |
| N-lauroyl-threonine | $-CHOH-CH_3$ | $C_{11}H_{23}$ | H | 0 | 1 |
| N-isopalmitoyl-sarcosine | H | $C_{15}H_{31}$ | $CH_3$ | 0 | 1 |
| N-linoleoyl-leucine | $-CH_2-CH(CH_3)_2$ | $C_{17}H_{31}$ | H | 0 | 1 |
| N-stearoyl-isoleucine | $-CH(CH_3)-C_2H_5$ | $C_{17}H_{35}$ | H | 0 | 1 |
| N-lauroyl-phenylalanine | $-CH_2C_6H_5$ | $C_{11}H_{23}$ | H | 0 | 1 |
| N-stearoyl-tyrosine | $-CH_2C_6H_4(OH)$ | $C_{17}H_{35}$ | H | 0 | 1 |
| N-myristyl-norvaline | $-C_3H_7$ | $C_{13}H_{27}$ | H | 0 | 1 |
| N-lauroyl-hexahydrophenylalanine | $-CH_2-C_6H_{11}$ | $C_{11}H_{23}$ | H | 0 | 1 |
| N-palmitoyl-dihydroxyphenylalanine | $-CH_2-C_6H_4(OH)_2$ | $C_{15}H_{31}$ | H | 0 | 1 |
| N-lauroyl-glycine | H | $C_{11}H_{23}$ | H | 0 | 1 |
| N-stearoyl-norleucine | $-C_4H_9$ | $C_{17}H_{35}$ | H | 0 | 1 |
| N-palmitoyl-N-methyl-tyrosine | $-CH_2C_6H_5(OH)$ | $C_{15}H_{31}$ | $CH_3$ | 0 | 1 |

*If the starting material employed is 6-(hexosaminyl-amino)-purine, the value of y would be 0, all other results tabulated above remaining the same. If the starting material employed is 6-(octosaminyl-amino)purine, the value of 6 would be 2, all other results tabulated above remaining the same.

EXAMPLE 6

*N-stearoyl glycine derivative of 6-(septosaminyl-amino) purine*

124 mg. of 6-(septosaminyl-amino)purine, dihydrochloride is dissolved in 3 ml. of dimethylformamide and .07 ml. of triethylamine to neutralize the hydrochloric acid is added. To this solution, at room temperature, is added dropwise with stirring a solution of 144 mg. of N-stearoylglycine p-nitrophenyl ester in 3 ml. of dimethylformamide. The reaction mixture quickly becomes yellow in color and after one hour standing a test shows that no more free amino-nucleoside is present. Ten ml. of methanol is added to the reaction mixture, the pH adjusted to 6.0 with aqueous hydrochloric acid, and the solution chilled overnight. The amorphous white precipitate which settles out is centrifuged down, washed two times with small portions of methanol and dried in vacuum to yield 180 mg. of the N-stearoyl-N'-glycyl derivative of 6-(septosaminyl-amino)purine, M.P. 219–220° with dec.

Similarly, substituting 6-(septosaminyl-amino)purine sulfate, for 6-(septosaminyl-amino)purine dihydrochloride while following the procedure set forth in Example 6, yields the N-stearoyl-N'-glycyl derivative of 6-(septosaminyl-amino)purine.

Similarly, following the procedure set forth in Example 6 but substituting equivalent amount of 6-(hexosaminyl-amino)purine and 6-(octosaminyl-amino)purine for 6-(septosaminyl-amino)purine, there is obtained the N-stearoyl-N'-glycyl derivatives of 6-(hexosaminyl-amino)purine and 6-(octosaminyl-amino)purine, respectively.

(It is to be understood that where isomeric forms of the amino acids are available, either form (i.e., the D- or L-form) may be employed with like results.)

This invention may be variously otherwise embodied within the scope of the appended claims.

What is claimed is:

1. A process for producing a new antibiotic, Septacidin, which comprises cultivating the microorganism *Streptomyces fimbriatus* ATCC 15051 in an aqueous nutrient medium under aerobic conditions extracting the fermentation broth with an organic solvent and evaporating off said organic solvent to obtain the said Septacidin.

2. A process for producing a new antibiotic, Septacidin, which comprises cultivating the microorganism *Streptomyces fimbriatus* ATCC 15051 in an aqueous nutrient medium under submerged aerobic conditions and recovering Septacidin from the fermentaton broth.

3. A process for producing a new antibiotic, Septacidin, which comprises cultivating the microorganism *Streptomyces fimbriatus* ATCC 15051 in an aqueous nutrient medium under areobic conditions and recovering Septacidin from the fermentation broth.

References Cited by the Examiner
UNITED STATES PATENTS 3,033,760   5/1962   Gaeumann et al. _____ 195—80
3,055,807   9/1962   Prelog et al. _____ 195—80

A. LOUIS MONACELL, *Primary Examiner.*

D. M. STEPHENS, *Assistant Examiner.*